Oct. 25, 1932.  W. A. RUSH  1,884,265
AUTOMOBILE PASSING LIGHT
Original Filed March 26, 1930  3 Sheets-Sheet 2

Inventor
Weaver A. Rush

Oct. 25, 1932.  W. A. RUSH  1,884,265
AUTOMOBILE PASSING LIGHT
Original Filed March 25, 1930    3 Sheets-Sheet 3
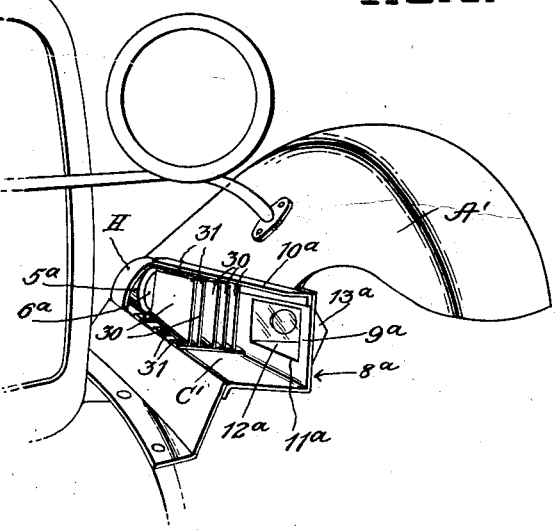
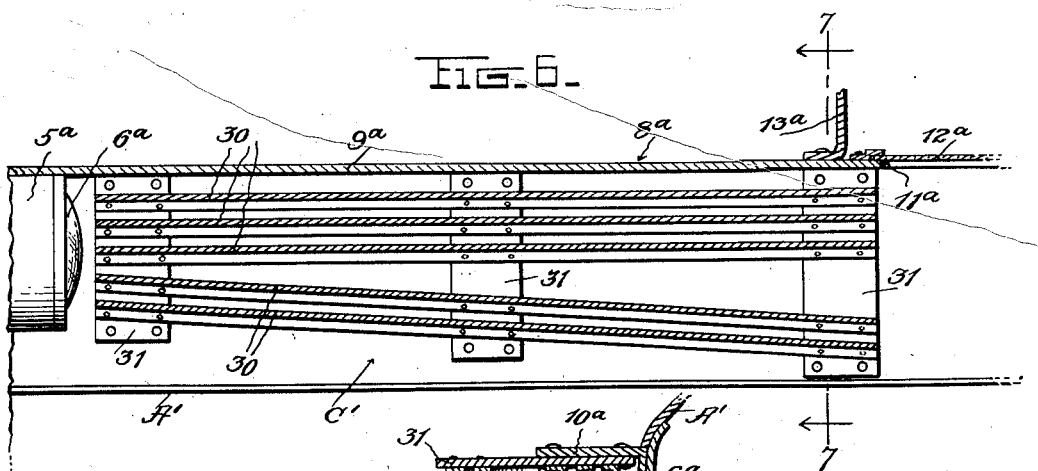
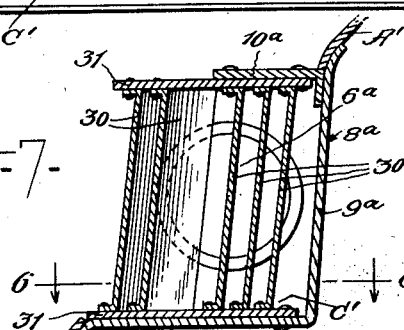
Inventor
Weaver A. Rush Patented Oct. 25, 1932

1,884,265

UNITED STATES PATENT OFFICE

WEAVER A. RUSH, OF BEATRICE, NEBRASKA

AUTOMOBILE PASSING LIGHT

Application filed March 26, 1930, Serial No. 439,070. Renewed January 26, 1932.

The invention aims to provide a new and improved light for use on automobiles, of such construction as to effectively illuminate the roadway straight ahead and along its right hand side, as well as effectively illuminating the entire front portion of the machine, when the usual headlights are turned off, the construction being such that the driver of an approaching vehicle is effectively shielded against glare and hence cannot become blinded.

Another object of the invention is to provide a passing light of such construction that it may readily be mounted on any automobile as an accessory, or may be built into the left front fender at the time of manufacture.

With the foregoing and minor objects in view, the invention resides in the novel subject matter hereinafter described and claimed, the description being accomplished by reference to the accompanying drawings.

Fig. 4 is an inner side elevation showing a construction which may be used when the device is to become an accessory or an attachment, instead of a built-in portion of the machine.

Fig. 5 is a view similar to Fig. 1 but showing a modified construction.

Fig. 6 is a horizontal sectional view on line 6—6 of Fig. 7.

Fig. 7 is a vertical transverse sectional view on line 7—7 of Fig. 6.

Figure 1:
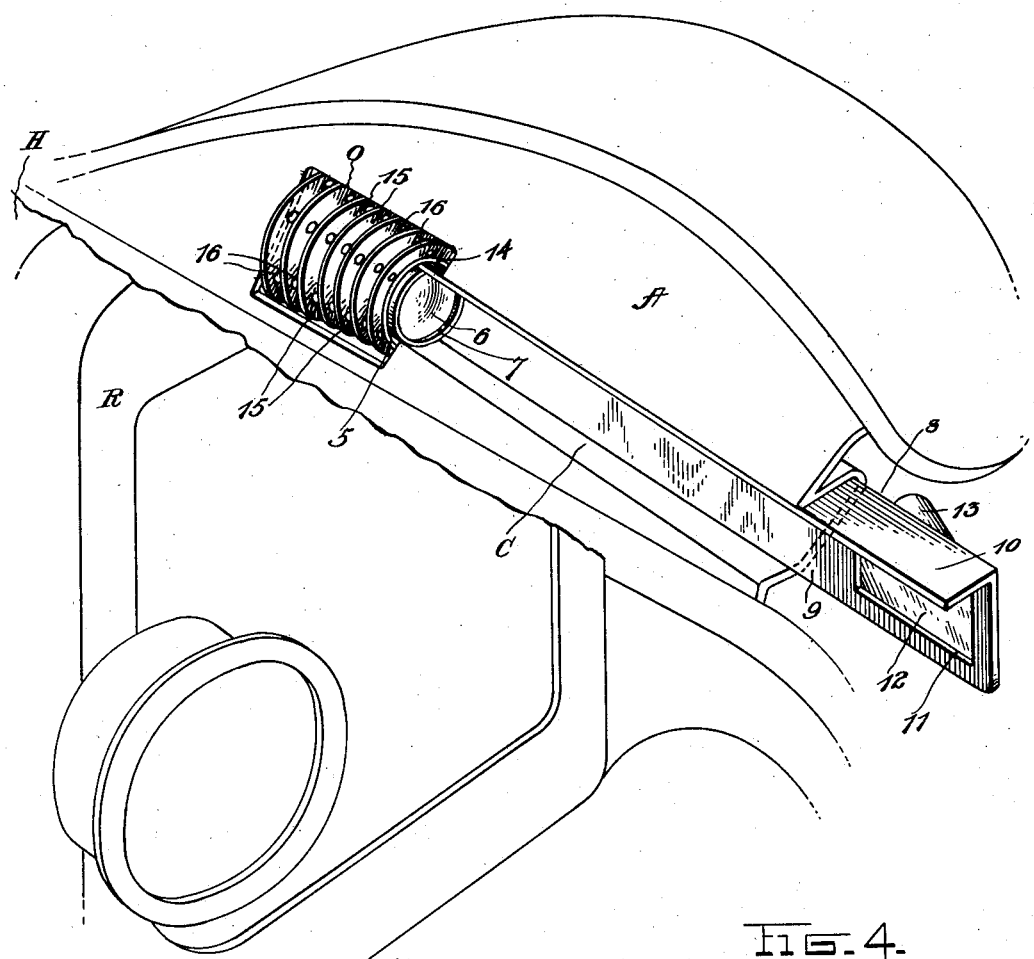
Fig. 1 is a perspective view of the front portion of an automobile, partly broken away and illustrating the invention built into the left front fender.
Figure 2:
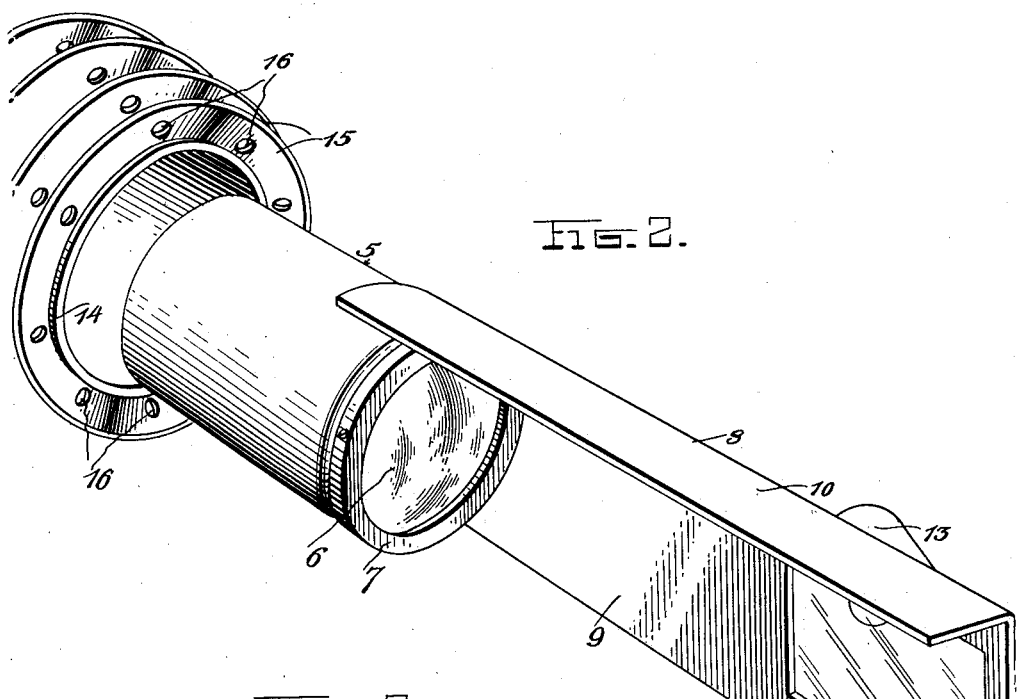
Fig. 2 is a perspective view of the passing light removed from the machine, the cooling means which preferably surrounds one of the light projectors being rearwardly withdrawn from the latter.

With one variation which will be later described, the device of Fig. 4 is identical with that shown in Figures 1–3, and hence one description will suffice. The numeral 5 denotes a projector adapted to project a beam of light forwardly and downwardly, the front end of said projector being provided with any appropriate lens 6 held in place by a rim 7 of suitable form. Rigidly secured to and projecting forwardly from the projector 5, is an elongated shield 8 which is preferably of arcuate cross section at its rear end, but gradually changed to angular cross section at its front end, said shield embodying a substantially vertical outer wall portion 9 extending throughout its length, and a lateral flange portion 10 of similar extent, said flange portion 10 projecting laterally inward from the upper part of the wall portion 9. The front end of this wall portion 9 is formed with an opening 11 which is preferably closed by a glass plate 12, and mounted at the outer side of said wall portion 9, is a second projector 13, this projector being disposed to project light rays laterally and downwardly through the opening 11.

The projector 5 is preferably of cylindrical form and in order that a high candle power bulb may be used in said projector without serious overheating, I prefer to provide novel means whereby the projector is air-cooled. In the present showing, a sleeve 14 is secured around the cylindrical casing of the projector, said sleeve being provided with annular flanges 15 at its periphery which slant forwardly and gradually increase in diameter from the front to the rear of said sleeve, so that all of said flanges will catch air in addition to carrying off heat. The inner portions of the flanges are formed with air-conducting openings 16 and the air directed inwardly by said flanges, escapes through these openings so that the projector 5 is effectively cooled.

The invention is mounted on an automobile between the conventional hood H and left front fender apron A, or is built into this apron. In Fig. 1, the rear portion of the apron A is formed with an opening O receiving the projector 5, and said apron is formed with a longitudinal channel C in which the shield 8 is secured, said channel opening toward the hood H and radiator R. Preferably, although not necessarily, the shield 8 projects forwardly beyond the apron A, disposing the projector 13 in front of the latter.

In the construction shown in Fig. 4, brackets 17 are secured to the shield 8 for anchorage to an appropriate part of an automobile, for the purpose of mounting the entire device in the angle between the apron A and the hood and radiator H—R. When the device is installed in either manner and the driver is to pass an approaching machine at night, the headlights are turned off and the bulbs in the projectors 5 and 13 are illuminated. The projector 5 directs a beam of light forwardly and downwardly onto the road ahead, and the projector 13 laterally projects rays of light which illuminate the front of the machine by which the device is carried and also effectively light up the right-hand side of the roadway. The shield 8 prevents the forward and downward beam of light from blinding the driver of the approaching vehicle and at the same time so illuminates the road ahead, as to insure safe driving. At the same time, the projector 13 so illuminates the front of the machine by which the device is carried, as to make it readily visible to the drive of the approaching machine. Also, the roadway is effectively illuminated along the right-hand side to overcome liability of running therefrom, striking pedestrians walking along the edge of the highway, etc.

Figure 3:
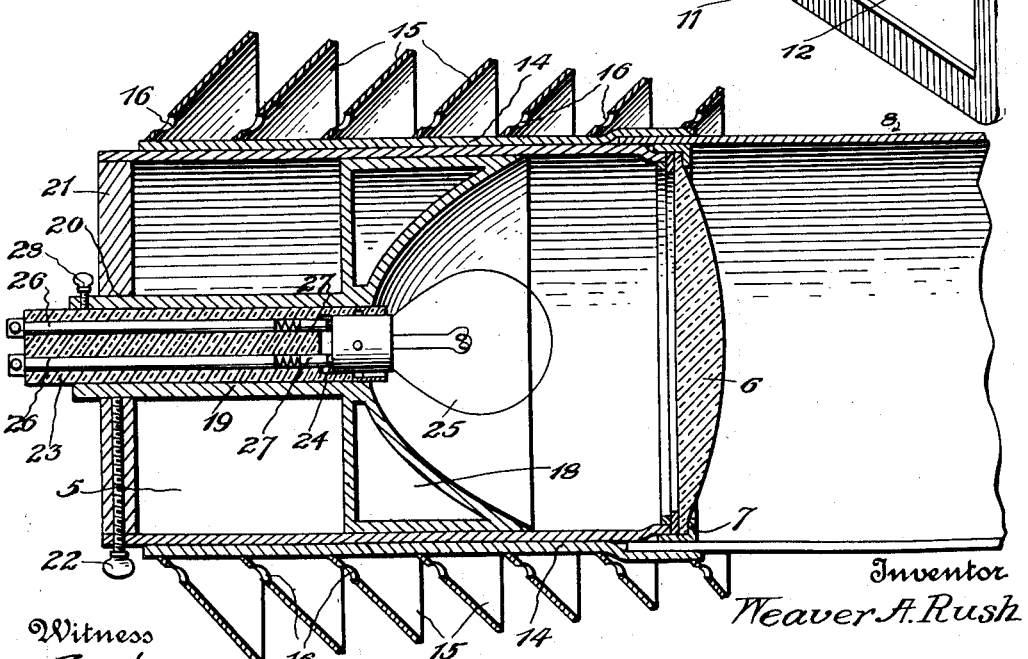
Fig. 3 is a vertical longitudinal sectional view through the rear portion of the device.

While any preferred provision could of course be made for focusing the projector 5, I prefer to employ the arrangement shown in Fig. 3. In this view, a piston-like reflector 18 is shown slidably received in the casing of the projector and provided with a rearwardly projecting tube 19. This tube passes slidably through an opening 20 in the rear end wall 21 of the projector casing and may be locked by a set screw 22. Loosening of this screw permits forward or rearward sliding of the tube 19 and reflector 18 to the most advantageous position, whereupon the parts may be locked by said screw 22.

Slidable within the tube 19, is a member 23 whose front end is provided with a socket 24 for a high candle power bulb 25, said part 23 also carrying conductors 26 whose rear ends are provided with appropriate means for connecting current conducting wires thereto, while their front ends are equipped with spring-pressed contacts 27 for engagement with the usual bulb contacts. If the invention is to be used upon machines whose various light bulbs are of single contact form, slight mechanical variations will of course be necessary, for only one conductor will be necessary, leading to the socket 24.

A set screw 28 is threaded through the tube 19 and serves to hold the part 23 after the latter has been adjusted. By loosening the two screws 22 and 28, relative adjustments of parts may be effected to properly focus the projector 5, whereupon both of said screws are again tightened.

In Figs. 5, 6 and 7, a built-in construction is shown, in which the projector 5ª is disposed in a housing H at the rear end of a longitudinal channel C' formed in the fender apron A'. The fender is provided with a guard 8ª extending forwardly from the projector 5ª and said guard embodies a vertical outer wall portion 9ª and a horizontal flange portion 10ª. At its front end, the wall portion 9ª is provided with an opening 11ª closed by a lens or the like 12ª, and secured at the outer side of said wall in position to direct rays through the opening 11ª, is an auxiliary projector 13ª.

Extending forwardly from the lens 6ª of the projector 5ª are a plurality of imperforate beam-controlling plates 30 which are disposed in substantially vertical planes and terminate at or near the rear end of the opening 11ª. There may be any desired number of the plates 30 and a plurality of them toward the wall 9ª, preferably extend parallel with each other, while the remainder of said plates diverge forwardly from said parallel plates as shown in Fig. 6. In the construction shown, the upper and lower edges of the plates 30 are secured to transverse strips 31, the lowermost of these strips being suitably secured to the bottom of the channel C' while the uppermost thereof are secured to the flange 10ª.

All of the plates are of nonreflecting nature so that they can give off no glare, and by the use of these plates, the rays of light from the projector 5, while being projected forwardly, upwardly, downwardly and to the right, will be prevented from passing to the left so that they cannot interfere with the vision of the driver of an approaching machine.

I claim:

1. In combination with an automobile having a hood and radiator at its front end, and a front fender apron laterally spaced from said hood and radiator; a light projector mounted on the automobile in position to forwardly and downwardly project a beam of light onto the road, a shield extending forwardly from said projector, said shield extending to the front of said apron, having a substantially vertical longitudinal wall portion disposed toward said apron, and having a longitudinal flange portion projecting toward said hood from the upper part of said wall portion, said wall portion having an opening at its front end, and a second light projector mounted at the outer side of said wall portion and disposed to project its rays through said opening in front of the radiator and downwardly onto one side of the road.

2. An automobile passing light comprising a light projector adapted to direct a beam of light forwardly, an elongated shield extending forwardly from said projector, said shield having a longitudinal substantially vertical outer wall portion and a longitudinal flange portion projecting laterally inward from the upper part of said wall portion, the front end of said wall portion having an opening, a second projector mounted at the outer side of said wall portion in position to direct rays of light laterally through said opening, and a plurality of substantially vertical forwardly extending plates in front of said projector and under said flange portion of said shield, said plates being disposed in closely spaced relation and serving to control the beam of light from the projector.

3. A structure as specified in claim 2; a number of said plates toward said vertical wall portion being parallel, the remainder of said plates being disposed in forwardly diverging relation with said parallel plates.

4. An automobile passing light adapted for mounting on one side of an automobile and comprising a projector constructed to forwardly project a safe-driving road-illuminating beam, an elongated shield extending forwardly from said projector, said shield having a longitudinal substantially vertical wall portion extending forwardly from the side of the projector toward the road center to confine said beam to the driver's side of the road, said shield also having a longitudinal flange portion projecting laterally from the upper part of said wall portion and positioned to prevent upward projection of said beam into the eyes of an approaching driver, and a second projector mounted at the front end of said shield, said second projector being constructed and positioned to project a second safe-driving road-illuminating beam obliquely in such co-operative relation with the first mentioned beam as to cause the two beams to safely illuminate the driver's side of the road.

5. An automobile passing light adapted for mounting on one side of an automobile and comprising a projector constructed to forwardly project a safe-driving road-illuminating beam, an elongated shield extending forwardly from said projector, said shield having a longitudinal substantially vertical wall portion extending forwardly from the side of the projector toward the road center to confine said beam to the driver's side of the road, said shield also having a longitudinal flange portion projecting laterally from the upper part of said wall portion and positioned to prevent upward projection of said beam into the eyes of an approaching driver, and a second projector carried by the front end of said shield, said second projector being constructed and positioned to project a second safe-driving road-illuminating beam obliquely in such co-operative relation with the first mentioned beam as to cause the two beams to safely illuminate the driver's side of the road.

6. In combination with an automobile having a hood and radiator at its front end, and a front fender apron laterally spaced from said hood and radiator; a light projector mounted on the automobile, said projector being constructed and positioned to forwardly project a safe-driving road-illuminating beam, a shield extending forwardly from said projector, said shield extending to the front of said apron and having a substantially vertical longitudinal wall portion spaced laterally from said hood and extending forwardly from the side of said projector toward the road center to confine said beam to the driver's side of the road, said shield having a longitudinal flange portion projecting toward said hood from the upper part of said wall portion to prevent upward projection of said beam into the eyes of an approaching driver, and a second projector mounted at the front end of said shield, said second projector being constructed and positioned to direct a second safe-driving road-illuminating beam obliquely in front of the radiator toward the ditch margin of said driver's side of the road and in such co-operative relation with the first mentioned beam as to cause the two beams to safely illuminate said side of the road.

7. In combination with an automobile; road-illuminating equipment for passing oncoming cars, consisting of the following elements mounted on the side of the automobile normally toward the center of the road; a projector constructed and positioned to forwardly project a safe-driving road-illuminating beam of light, a shield extending forwardly from said projector, said shield having a substantially vertical longitudinal wall portion extending forwardly from the side of the projector toward the road center to confine said beam to the side of the road legally allotted to said automobile, said shield also having a longitudinal flange portion projecting from the upper part of said wall portion toward the center of the car to prevent upward projection of said beam into the eyes of an approaching car driver, and a second projector mounted at the front end of said shield, said second projector being constructed and positioned to project a second safe-driving, road-illuminating beam obliquely in front of said automobile toward the ditch margin of the aforesaid side of the road and in such co-operative relation with the first named beam as to cause the two beams to safely illuminate said side of the road.

In testimony whereof I affix my signature.

WEAVER A. RUSH.